United States Patent
Xie (10) Patent No.: US 9,511,516 B2
(45) Date of Patent: Dec. 6, 2016

(54) METHOD AND APPARATUS FOR MANUFACTURING QUARTZ SLAB

(71) Applicant: Alex Xie, West Windsor, NJ (US)

(72) Inventor: Alex Xie, West Windsor, NJ (US)

(*) Notice: Subject to any disclaimer, the term of this patent is extended or adjusted under 35 U.S.C. 154(b) by 322 days.

(21) Appl. No.: 14/496,249

(22) Filed: Sep. 25, 2014

(65) Prior Publication Data

US 2016/0089818 A1    Mar. 31, 2016

(51) Int. Cl.
| | | |
|---|---|---|
| *B29C 39/44* | (2006.01) | |
| *B29C 39/00* | (2006.01) | |
| *B29C 39/24* | (2006.01) | |
| *B29C 39/04* | (2006.01) | |
| *B44F 9/04* | (2006.01) | |
| *B29C 67/24* | (2006.01) | |

(52) U.S. Cl.
CPC ............. *B29C 39/44* (2013.01); *B29C 39/003* (2013.01); *B29C 39/04* (2013.01); *B29C 39/24* (2013.01); *B29C 67/243* (2013.01); *B29K 2509/14* (2013.01); *B44F 9/04* (2013.01)

(58) Field of Classification Search
None
See application file for complete search history.

(56) References Cited

U.S. PATENT DOCUMENTS

| | | | | |
|---|---|---|---|---|
| 3,088,713 | A * | 5/1963 | Gard | B01F 5/241 137/607 |
| 5,266,253 | A * | 11/1993 | Dijkhuizen | B29C 37/0032 264/112 |
| 5,885,503 | A * | 3/1999 | Bordener | B29C 35/02 264/254 |
| 6,517,915 | B1 | 2/2003 | Banus | |
| 8,436,075 | B2 | 5/2013 | Buskila et al. | |
| 8,702,886 | B2 | 4/2014 | Yaniv et al. | |
| 9,186,819 | B1 * | 11/2015 | Grzeskowiak, II | B29C 31/10 |
| 2004/0175514 | A1 * | 9/2004 | Stiattesi | B29C 39/025 428/15 |
| 2006/0101752 | A1 * | 5/2006 | Sakai | C04B 26/06 52/311.3 |
| 2012/0283384 | A1 * | 11/2012 | Cox | B29C 39/003 524/786 |

* cited by examiner

*Primary Examiner* — Mary F Theisen
(74) *Attorney, Agent, or Firm* — Walter J. Tencza, Jr.

(57) ABSTRACT

An apparatus including a mold having a top opening which leads to an inner chamber. The mold may include a first, second, third, and fourth walls, and a bottom which enclose the inner chamber. The apparatus may further include a first and/or second devices which are configured with respect to the mold to supply first and/or second mixtures of quartz and resin to the inner chamber of the mold. The apparatus may include transportation sheet which lies in the inner chamber of the mold and on an inside surface of the third wall of the mold, and which is sandwiched between the first wall and the third wall of the mold and the second wall and the third wall of the mold. The first and second devices may include means for moving the mold to allow placement of the first and/or second mixtures in specific areas of the inner chamber.

26 Claims, 10 Drawing Sheets

METHOD AND APPARATUS FOR MANUFACTURING QUARTZ SLAB

FIELD OF THE INVENTION

This invention relates to improved methods and apparatus concerning quartz slabs.

BACKGROUND OF THE INVENTION

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications.

The production of engineered stone generally involves particulate materials such as ground quartz rock, crushed glass, rocks, pebbles, sand, shells, silicon, and other inorganic materials combined with polymers, binders, resins, colorants, dyes, etc. The particulate material(s) may be varying sizes ranging from four hundred mesh particle size to four mesh particle size with multiple materials of different sizes used simultaneously. The polymer may include agents to such as a binder, hardener, initiator, or combination of such. The particulate material(s) and polymers, binders, resins, colorants, dyes, etc. are then mixed resulting in a slightly damp mixture. This initial mixture may be processed through a crushing machine to reduce the size of the combined particles. The resultant, finer mixture may be poured into a supporting mold, tray, or other supporting structure, after that, the slab is moved into a vacuumed press machine to be pressed, and then, moved into a curing machine to be cured into a hardened quartz slab. After curing, the slab is generally moved in a grinder to be grinded to a desired thickness, followed by a polisher to finish the product.

Quartz based stone has many advantages over natural stone such as marble and granite. Compared to these natural stones quartz is harder, stronger, less water absorbent, and more resistant to staining, scratching, breakage, chemicals, and heat. One of the drawbacks of quartz is its perceived lack of natural, random looking veins and color patterns compared with natural stones. This invention addresses a method of producing a quartz based slab with single color patterns or multiple color patterns and/or veins.

SUMMARY OF THE INVENTION

In at least one embodiment of the present application, an apparatus is provided comprising a mold having a top opening which leads to an inner chamber. The mold may include a first wall, a second wall, a third wall, and a fourth wall, and a bottom which enclose the inner chamber. The apparatus may further include first and/or second, and/or one or more further devices which are configured with respect to the mold to supply a first, second, and/or one or more further mixtures of quartz and resin to the inner chamber of the mold. The apparatus may be further comprised of a transportation sheet which lies in the inner chamber of the mold and on an inside surface of the third wall of the mold, and which is sandwiched between the first wall and the third wall of the mold and the second wall and the third wall of the mold.

Each of the first and/or second devices and/or one or more further devices may include means for moving the mold to allow placement of the first and/or second and/or one or more further mixtures of quartz and resin in specific areas of the inner chamber. Such means for moving the mold may include, for example, belts or racks and rollers, cable structures, hydraulic mechanism structure, pneumatic structure, or other methods or combined methods of driving mechanism, which may be controlled by a computer or computer processor.

In at least one embodiment, the first device includes a first hopper, a first belt, and a first set of one or more rollers. In at least one embodiment the first device may include a mold belt having grooves; one or more gears with protrusions which mesh with the grooves of the mold belt; and wherein the mold is configured to be supported on the mold belt having grooves.

The apparatus may include a second device which is configured with respect to the mold to supply a second mixture of quartz and resin to the inner chamber of the mold, while at the same time the first device is supplying the first mixture of quartz and resin to the inner chamber of the mold. The second device may include a second hopper, a second belt, and a second set of one or more rollers.

The first device may include a first valve, wherein the first valve controls a size of a bottom opening of the first hopper through which the first mixture of quartz and resin is supplied to the first belt. The first belt may move to supply the first mixture of quartz and resin to the inner chamber of the mold. The first valve may control a size of a bottom opening of the first hopper through which the first mixture of quartz and resin is supplied to the first belt.

The second device may include a second valve; and the second valve may control a size of a bottom opening of the second hopper through which the second mixture of quartz and resin is supplied to the second belt. The second belt may move to supply the second mixture of quartz and resin to the inner chamber of the mold.

The first device may include a first hopper having a bottom opening, and a first funnel having a top opening and a bottom opening; wherein the first funnel is fixed with respect to the first hopper so that the top opening of the first funnel receives the first mixture of quartz and resin which falls through the bottom opening of the first hopper. The first device may be further comprised of a first motor for controlling an orientation of the first funnel so that the bottom opening of the first funnel can be placed at different locations with respect to the top opening of the mold.

The second device may include a second hopper having a bottom opening, and a second funnel having a top opening and a bottom opening; wherein the second funnel is fixed with respect to the second hopper so that the top opening of the second funnel receives the second mixture of quartz and resin which falls through the bottom opening of the second hopper. The second device may be further comprised of a second motor for controlling an orientation of the second funnel so that the bottom opening of the second funnel can be placed at different locations with respect to the top opening of the mold.

The apparatus may include a computer processor which communicates with the first device to control how much of the first mixture of quartz and resin is supplied to the inner chamber of the mold by the first device. The computer processor may communicate with the first device to cause the first device to supply the first mixture of quartz and resin to a first area of the inner chamber of the mold. The computer processor may communicate with the first device to cause the first device to supply the first mixture of quartz and resin to a second area of the inner chamber of the mold, which is different from the first area of the inner chamber of the mold.

In at least one embodiment, a method is provided which includes supplying a first mixture of quartz and resin to an inner chamber of a mold; wherein the mold has a top opening which leads to an inner chamber, and the mold includes a first wall, a second wall, a third wall, and a fourth wall, and a bottom which enclose the inner chamber. The method may further include closing the top opening of the mold with a mold gate after the first mixture of quartz and resin has been supplied to the inner chamber; turning the mold about ninety degrees; lifting a mold cover, including the first wall, the second wall, the fourth wall, the bottom, and the mold gate off of the third wall; and moving a slab formed at least in part from the first mixture of quartz and resin on a transportation sheet sandwiched between the slab and the third wall. The first mixture may be supplied by a first device including a first hopper, a first belt, and a first set of one or more rollers.

The method may further include moving the mold on a mold belt, which is moved by one or more gears; wherein each of the one or more gears has protrusions which mesh with grooves of the mold belt. The method may further include supplying a second mixture of quartz and resin to an inner chamber of a mold, wherein the second mixture is different from the first mixture. The first mixture may be supplied by a first device including a first hopper, a first belt, and a first set of one or more rollers; and the second mixture may be supplied by a second device including a second hopper, a second belt, and a second set of one or more rollers.

The first device may include a first valve; and the first valve may control a size of a bottom opening of the first hopper through which the first mixture of quartz and resin is supplied to the first belt; and the first belt may move to supply the first mixture of quartz and resin to the inner chamber of the mold. The second device may include a second valve; wherein the second valve controls a size of a bottom opening of the second hopper through which the second mixture of quartz and resin is supplied to the second belt; and wherein the second belt moves to supply the second mixture of quartz and resin to the inner chamber of the mold.

The first device may include a first hopper having a bottom opening, and first funnel having a top opening and a bottom opening; wherein the first funnel is fixed with respect to the first hopper so that the top opening of the first funnel receives the first mixture of quartz and resin which falls through the bottom opening of the first hopper; and the method may further include controlling an orientation of the first funnel so that the bottom opening of the first funnel can be placed at different locations with respect to the top opening of the mold.

The second device may include a second hopper having a bottom opening, and a second funnel having a top opening and a bottom opening; wherein the second funnel is fixed with respect to the second hopper so that the top opening of the second funnel receives the second mixture of quartz and resin which falls through the bottom opening of the second hopper; and the method may further include controlling an orientation of the second funnel so that the bottom opening of the second funnel can be placed at different locations with respect to the top opening of the mold.

The method may further include using a computer processor to control how much of the first mixture of quartz and resin is supplied to the inner chamber of the mold by the first device. The computer processor may communicate with the first device to cause the first device to supply the first mixture of quartz and resin to a first area of the inner chamber of the mold. The computer processor may communicate with the first device to cause the first device to supply the first mixture of quartz and resin to a second area of the inner chamber of the mold, which is different from the first area of the inner chamber of the mold.

DETAILED DESCRIPTION OF THE DRAWINGS

Figure 1:
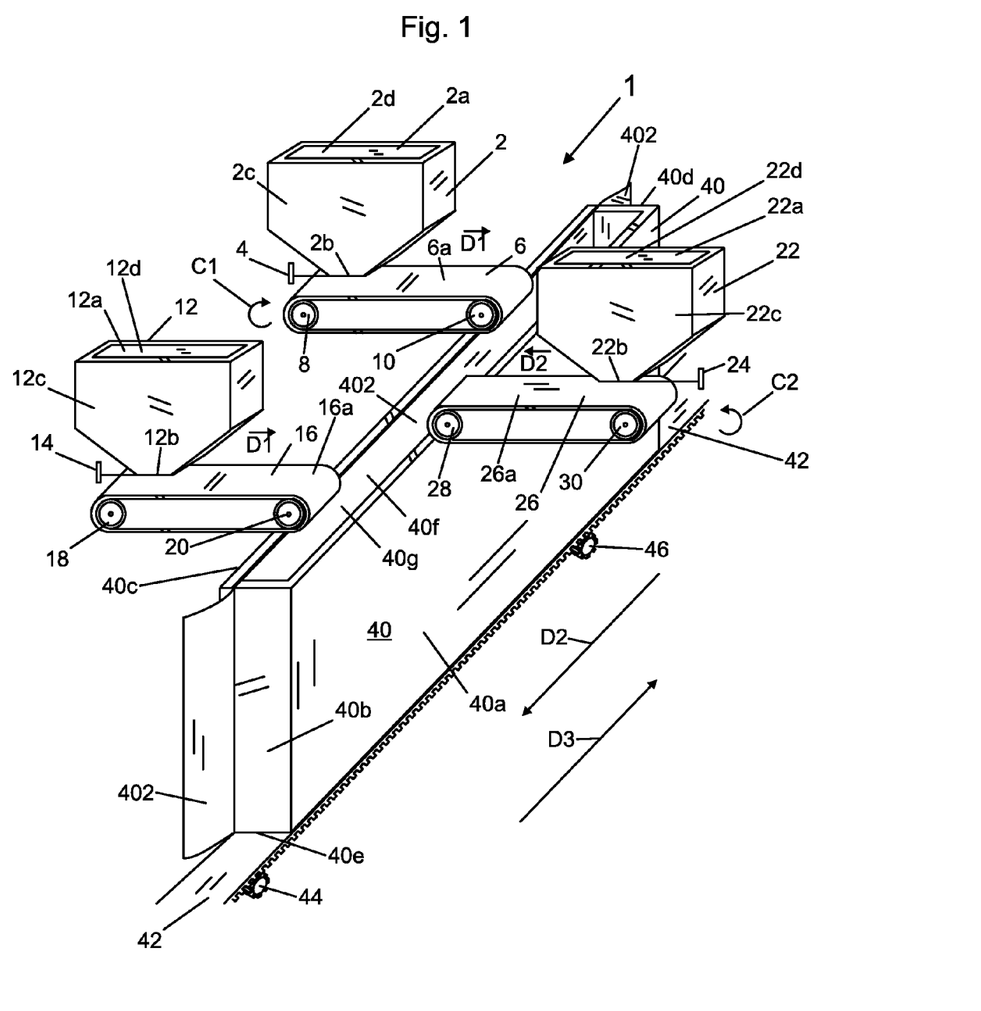
FIG. 1 shows a front, top, and right perspective view of an apparatus in accordance with an embodiment of the present invention.

FIG. 1 shows a front, top, and right perspective view of an apparatus 1 in accordance with an embodiment of the present invention. The apparatus 1 includes hoppers 2, 12, and 22, valves 4, 14, and 24, conveyor belts 6, 16, and 26, rollers 8, 10, 18, 20, 26, and 30, mold 40, rack 42, and gears 44 and 46. In at least one embodiment the rack 42 and gears 44 and 46 may be replaced by or may be a belt.

The hopper 2 has a top opening 2a leading to an inner chamber 2d, a peripheral side wall structure 2c, and a bottom opening 2b. The valve 4 is configured so that it can open and close the bottom opening 2b. When the bottom opening 2b is opened, particles placed into the inner chamber 2d through the top opening 2a fall through the opening 2b and onto the conveyor belt 6. When the bottom opening 2b is closed by the valve 4, then particles placed into the inner chamber 2d through the top opening 2a, do not fall through the opening 2b and remain in the inner chamber 2d.

Similarly or identically, the hoppers 12 and 22 have top openings 12a and 22a leading to inner chambers 12d and 22d, peripheral side wall structures 12c and 22c, and bottom openings 12b and 22b, respectively. The valves 14 and 24 are configured so that they can open and close the bottom openings 12b and 22b, respectively. When the bottom openings 12b and 22b are opened, particles placed into the inner chambers 12*d* and 22*d* through the top openings 12*a* and 22*a* fall through the openings 12*b* and 22*b*, and onto the conveyor belts 16 and 26, respectively. When the bottom openings 12*b* and 22*b* are closed by the valves 14 and 24, then particles placed into the inner chambers 12*d* and 22*d* through the top openings 12*a* and 22*a*, do not fall through the openings 12*b* and 22*b* and remain in the inner chambers 12*d* and 22*d*.

The mold 40 includes walls 40*a*, 40*b*, 40*c*, and 40*d*, and closed bottom 40*e* which enclose an inner chamber 40*g*. A top opening 40*f* leads to the inner chamber 40*g*. The bottom 40*e* sits on the rack 42, or a belt, in at least one embodiment, which is moved in the direction D2 by rotating gears 44 and 46.

In operation, the rollers 8, 10, 18, and 20 are caused to rotate in the clockwise direction C1 by a motor or motors not shown. The rotation of the rollers 8 and 10 in the clockwise direction C1, causes the belt 6 to rotate in the clockwise direction around the rollers 8 and 10. Particles falling through the bottom opening 2*b* onto an outer surface 6*a* of the belt 6 are moved in the direction D1, and after passing the roller 10, fall off of the belt 6, fall through the opening 40*f* of the mold 40 and into the inner chamber 40*g* of the mold 40.

Similarly or identically, the rotation of the rollers 18 and 20 in the clockwise direction C1, causes the belt 16 to rotate in the clockwise direction around the rollers 18 and 20. Particles falling through the bottom opening 12*b* onto an outer surface 16*a* of the belt 6 are moved in the direction D1, and after passing the roller 20, fall off of the belt 16, fall through the opening 40*f* of the mold 40 and into the inner chamber 40*g* of the mold 40.

Similarly or identically, the rotation of the rollers 28 and 30 in the counter clockwise direction C2, causes the belt 26 to rotate in the counter clockwise direction around the rollers 28 and 30. Particles falling through the bottom opening 22*b* onto an outer surface 26*a* of the belt 26 are moved in the direction D2, and after passing the roller 28, fall off of the belt 26, fall through the opening 40*f* of the mold 40 and into the inner chamber 40*g* of the mold 40.

The mold 40 moved on the gear 42 is moved back and forth in the directions D2 and D3, in at least one embodiment. The computer processor 602 of FIG. 8 individually controls the valves 4, 14, and 24 which control opening sizes for openings 2*b*, 12*b*, and 22*b*, respectively. The computer processor 602 also individually controls speeds of belts 6, 16, and 26 through, motors 604, 606, and 608, for rollers 8, 18, and 28, respectively. The rollers 10, 20, and 30 may be idler or passive rollers in at least one embodiment. The position of the mold 40 (and/or movement), allows the distribution of particles from the hoppers 2, 12, and 22 to the inner chamber 40*g* of the mold 40 to a desired pattern.

In at least one embodiment, the inner chamber 2*d* of the hopper 2 may have located therein a first mixture of quartz and resin having a first color or first color mixture, the inner chamber 12*d* of the hopper 12 may have located therein a second mixture of quartz and resin having a second color or second color mixture, and the inner chamber 22*d* of the hopper 12 may have located therein a third mixture of quartz and resin having a third color or third color mixture. Although three hoppers are shown in FIG. 1, i.e. hoppers 2, 12, and 22, in at least one embodiment, there would be at least two hoppers, providing at least two different colors or color mixtures of quartz and resin.

In at least one embodiment, roller 8 is controlled by the first motor 604, roller 18 is controlled by a second motor 606 and roller 28 is controlled by a third motor 608. The rotational speed of each of belts 6, 16, and 26 can be controlled by controlling the rotational speed of the appropriate roller of rollers 8, 18, and 28. For example, the rotational speed of the belt 6 can be controlled by controlling the rotational speed of roller 8. If the rotational speed of a particular roller of 8, 18, and 28, is raised, the amount of the particular mixture of quartz and resin delivered to the inner chamber of 40*g* of the mold 40 is raised. If the rotational speed of a particular roller of 8, 18, and 28 is lowered, the amount of the particular mixture of quartz and resin delivered to the chamber of 40*g* of the mold is lowered. For example, raising the rotational speed of the roller 8 in the clockwise direction C1 causes the rotational speed of the belt 6 to be increased which delivers more particles of the first mixture of quartz and resin to the inner chamber 40*g* of the mold 40, at the same time, by positioning the mold 40 by movement in the directions D2 or D3 shown in FIG. 1 (moved through rack gear device or belt 42, controlled by the computer processor 602), a particular area of the formed mixture in the inner chamber 40*g* of the mold 40 will receive more of the first mixture of quartz and resin. The rotational speed of the rollers 8, 10, and 18, in at least one embodiment is controlled by computer processor 602 shown in FIG. 8. The computer processor 602 may be connected by communications links to motors 604, 606, and 608 for rollers 8, 18, 28, respectively. Thus the computer processor 602 can individually control the rotational speed of each of rollers 8, 18, and 28, and thereby control the rotational speed of belts 6, 16, and 26, and thereby control the amount of the particular mixture delivered to the inner chamber 40*g*.

Figure 8:
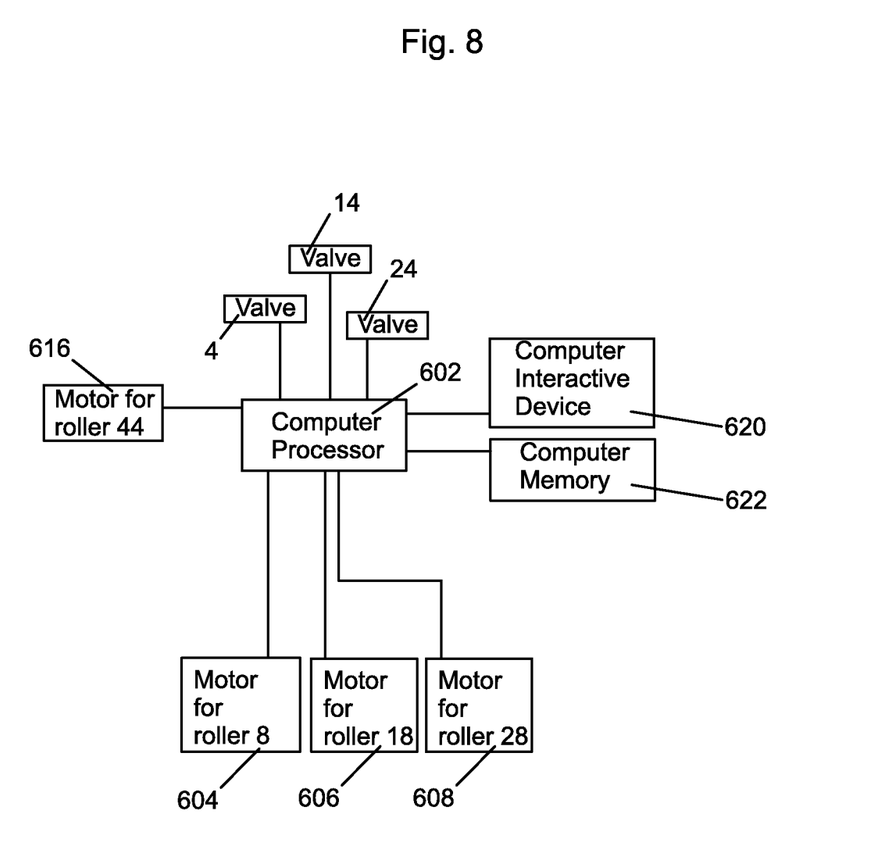
FIG. 8 shows a block diagram of a computer processor and other components for controlling one or more aspects of the apparatus of FIG. 1.

The computer processor 602 is also connected by communications links to motor 616 for roller 44. Roller 46 may be a passive roller or idler roller. The computer processor 602, in at least one embodiment is configured to send commands or signals to motor 616 to cause the belt 42 to move back and forth, or stop, or slow down or speed up, and/or oscillate, in the directions D2 and D3. The speed of the back and forth movement or oscillation in the direction D2 and D3 can be controlled by the computer processor 602. The manner in which the motors 604-618 are controlled, in at least one embodiment, may be determined by a computer program stored in computer memory 622. Alternatively, or additionally, the manner in which the motors 604-618 are controlled may be determined by input from a human operator through a computer interactive device 620.

By controlling the amounts of the first, second, and third mixture supplied to the chamber 40*g* and the speed of the back and forth movement of the mold 40 or by controlling the position of the mold 40 through the movement either in direction D2 or D3 should in FIG. 1, different aesthetic or artistic patterns of combinations of the first, second, and third mixtures are obtained inside the chamber 40*g*. In operation, when the chamber 40*g* is filled up to the top opening 40*f*, a mold gate 50 is put in position to cover the mold opening 40*f*; the mold 40 is then turned from the vertical position of FIG. 1, to a horizontal or flat position. In at least one embodiment, the mold gate 50 will prevent the first, second, and third mixtures in the chamber 40*g* from falling out of the chamber 40*g*.

Figure 2:
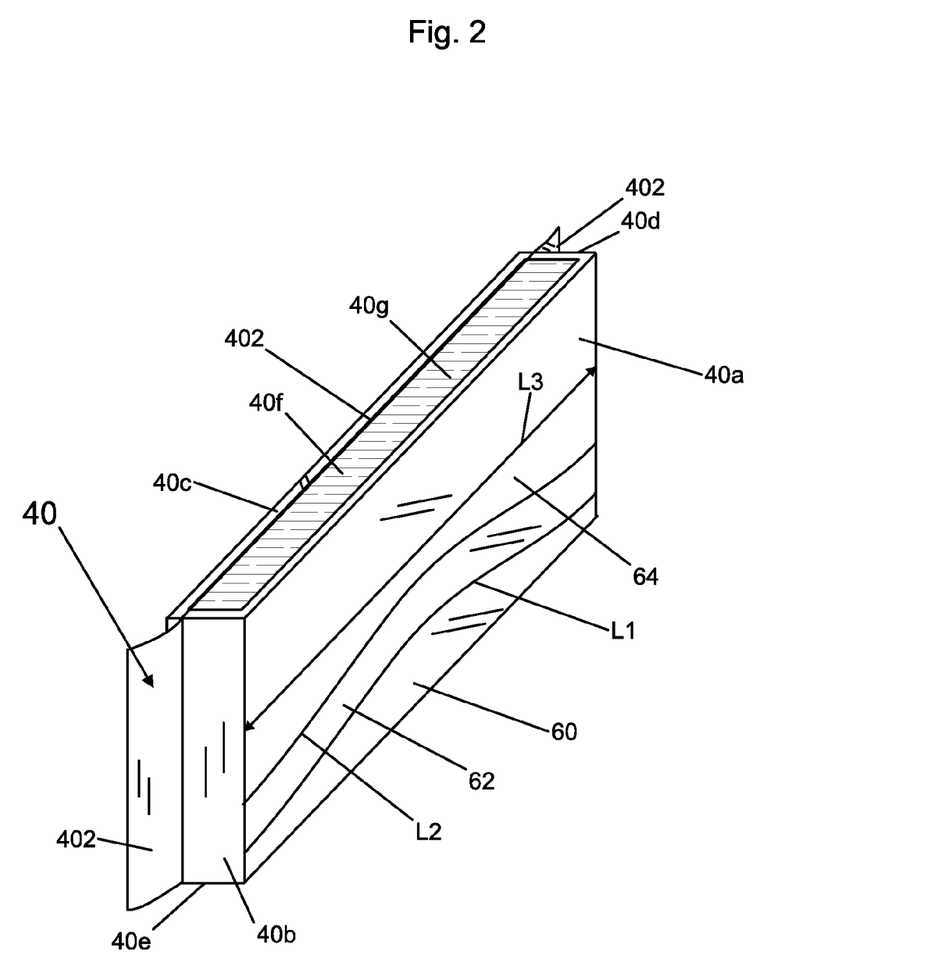
FIG. 2 shows a front, top, and right perspective view of a mold in for use with the apparatus of FIG. 1.

FIG. 2 shows the mold 40 filled up to the top opening 40*f* with a combination of the first mixture provided by the hopper 2, the second mixture provided by the hopper 12, and the third mixture provided by the hopper 22. As one example, the first mixture provided by the hopper 2 may be located in area 60 between the bottom 40*e* and the line L1 shown in FIG. 2. The second mixture provided by the hopper 12 may be located in the area 62 between the lines L1 and L2, and the third mixture 64 may be located in the area 64 between the line L2 and the top opening 40f. The side 40a may be transparent to allow the combination of the first, second, and third mixtures to be seen through the side 40a.

The mold 40 is shown in FIG. 1 as shaped as a rectangular prism but the mold 40 can be or can be replaced by a mold in another shape. In at least one embodiment, the mold 40 is placed under a setup including quartz and resin mixture reserving tanks or hoppers and dropping belts which will carry a mixture of quartz and resin into the mold 40 at predetermined rate. Some examples of possible setups are shown in FIGS. 1, 3, 4, and 5, wherein the mold 40 may be the same as or substantially similar to the molds 114, 214, and 314.

Generally, speaking in at least one embodiment, the mold 40 (or 114, 214, 314) is in a vertical position as shown in FIG. 1, and is closed on all sides except the top 40f, and except for an inserted transportation sheet 402. The transportation sheet 402 is placed along the inner side of 40c of the mold 40. This transportation sheet 402, shown in FIG. 1 is generally paper or laminated paper or fabric, but can be another suitable material. The opposite large face/side 40a of the mold 40 can be made of tempered glass or other transparent material allowing for viewing of the mixture in the mold 40.

The dropping belt or belts, such as belts 6, 16, and 26 in FIG. 1, carry the mixture or mixtures which come out of the reserving tanks or hoppers 2, 12, and 22, and drop the mixture or mixtures through the open top 40a of the mold 40 into the moving mold 40. The movement of the mold 40 may also be sped up for less mixture to be dropped in particular area of mold 40, or slowed down or stopped to allow for more mixture to be dropped in particular area of the mold 40 by a computer processor 602 of FIG. 8. The speed of the dropping belt or belts such as belts 6, 16, and 26 is controlled by the computer processor 602. The reserving tank or hopper opening valve or valves 4, 14, and 24 may be controlled by computer processor 602. The mold 40, in at least one embodiment, moves back and forth on the mold rack or belt 42 shown in FIG. 1, and the moving speed and direction of movement of the rack 42 is controlled by computer processor 602, such as by controlling the rotational direction or rotation speed of gears 44 and 46. In FIG. 1, the mold 40 has been put on a rack or belt structure 42, moved by motor which is controlled by computer processor 602. The mold 40 could also be pulled or pushed back and forth in the directions D2 and D3 by other means in accordance with one or more embodiments of the present invention, such as a cable structure, by a hydraulic mechanism structure, by a pneumatic structure, or other methods or combined methods of driving mechanism, which could be controlled by a computer or computer processor.

By controlling having the valves 4, 14, and 24 control the opening size for the openings 2b, 12b, and 22b, the speed of the dropping belts 6, 16, and 26, and the position or movement of the mold 40, quartz and resin mixtures of different colors or compositions can be dropped into the chamber 40g of the mold 40 to produce a pattern or veining in the formed mixture. This pattern or veining will appear as "layers" when viewed through the transparent mold cover or side 40a.

Figure 6:
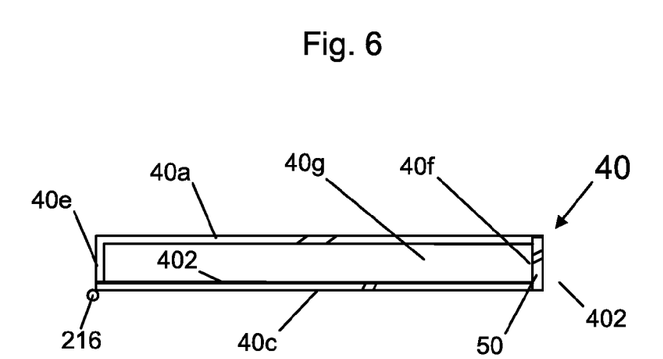
FIG. 6 shows a front view of a fourth further apparatus in accordance with a fourth further embodiment of the present invention.

Once the mold 40 is filled with the mixtures, a mold gate 50 shown in FIG. 6 is attached to close the opening 40f shown in FIG. 1, so that the mold 40 is completely sealed on all sides.

Each of the mixture reserving tanks or hoppers 2, 12, and 22 has a valve whose opening and closing is controlled by the computer processor 602 by a motor as shown by FIG. 8. In addition, the hoppers 2, 12, and 22 may be moved in the directions D2 and D3 along the length of the mold 40. The combined structure of hopper 2, valve 4, belt 6, and rollers 8 and 10 may be set at a different height from the combined structure of hopper 12, valve 14, belt 16, and rollers 18 and 20 to avoid collisions of hopper 2 and hopper 12 and related components and to allow the hopper 2 and hopper 3 to traverse the entire length L3 shown in FIG. 2 of the mold 40, and this movement may be controlled by the computer processor 602. In at least one embodiment the combined structure of hopper 2, valve 4, belt 6, and rollers 8 and 10 and the combined structure of hopper 12, valve 14, belt 16, and rollers 18 and 20 may be placed on the same rack, track or belt, so that the two combined structures are at the same height; and in this embodiment, the two combined structures can be moved back and forth in the directions D2 and D3 of FIG. 1. One of the two combined structures, such as for example, including components 12, 14, 16, 18, and 20, may move pass the end of the mold 40 in the direction D2 of FIG. 1 to allow the space for the following combined structure, such as including components 2, 4, 6, 8, and 10 to drop the desired color of the mixture, but once a combined structure passes the end of the mold 40, either in the direction D2 or D3, the belt of that combined structure, (such as belt 16 of combined structure including components 12, 14, 16, 18, and 20 or belt 6 of combined structure including components 2, 4, 6, 8, and 10) is stopped so the mixture from that particular combined structure will not fall off of the particular belt. In at least one embodiment, the hoppers 2, 12, and 22 are fixed translationally with respect to their belts 6, 16, and 26 (and corresponding rollers), so that when the hoppers 2, 12, and 22 are moved the belts 6 (and rollers 8 and 10), 16 (and rollers 18 and 20), and 26 (and rollers 28 and 30) are moved along the length of the mold 40. There may be separate motors, not shown, provided for this movement of the hoppers 2, 12, and 22, in conjunction with the belts and rollers. Alternatively or additionally, the mold 40 may be moved on the mold rack or belt 42 instead, or both the channel and mold can be moved by the computer processor 602.

The valves 4, 14, and 24 of the mixture reserving tanks or hoppers 2, 12, and 22 cause the openings 2b, 12b, and 22b, to be opened to the appropriate size while the belts 6, 16, and 26 are rotated by their respective rollers at the appropriate speed along the open edge of the mold 40, and the mold 40 is moved to an appropriate position in the directions D2 and D3 by the rack 42 or belt 42 at the same time.

The opening size for to which the openings 2b, 12b, and 22b are opened by the valve valves 4, 14, and 24, respectively, the speed of belts 6, 16, and 26, and the position of the mold 40 are coordinated by the computer processor 602 so the appropriate quantity of specific color of quartz mixture are dropped into the appropriate area of the inner chamber 40g mold 40.

In at least one embodiment, when the hoppers 2, 12, and 22 are moved translationally (along with their corresponding belt and rollers), once the particular hopper of hoppers 2, 12, and 22 reaches an end of the mold 40, it may stop and move the opposite direction as controlled by the computer processor 602. This movement may continue back and forth as needed along the length of the mold 40 in the directions D2 and D3. The movement of the hoppers 2, 12, and 22 may also be slowed down or stopped to allow for more mixture to be dropped in a particular area of the mold 40, or the mold 40 may be moved by belt 42.

Quartz and resin mixtures of different colors or compositions can be dropped to produce a pattern or veining. This pattern or veining will appear as "layers" when viewed through the transparent mold cover or side 40a. Once the mold is filled to the top opening 40f of FIG. 1, the cover or gate 50 shown in FIG. 6 is attached along the open edge so that the mold 40 is completely sealed on all sides.

Figure 7:
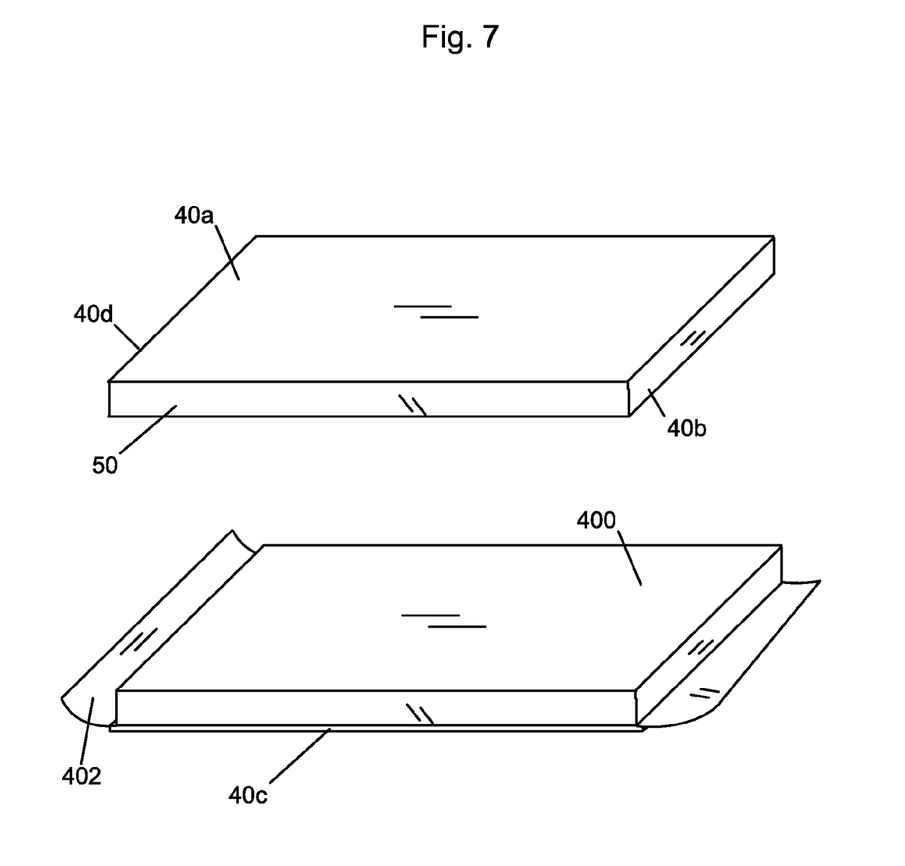
FIG. 7 shows a front, top, and right perspective view of a fifth further apparatus in accordance with a fifth further embodiment of the present invention.

There could be multi-color mixtures dropped into hopper, such as hopper 2, to form a variegated mixture, then drop into the mold 40, or any of this kind of combination. The mold 40 is then rotated ninety degrees into a horizontal position so the transportation sheet 402 shown in FIG. 1, FIG. 2, and FIG. 7 is on the bottom and the transparent cover 40a is on top. The mold cover which includes 40a, 40b, 40d, 40e, and mold gate 50 but not 40c, is removed upward leaving the formed quartz mixture or slab 400 in resting on top of the transportation sheet 402 and mold plate 40c as shown in FIG. 7. In at least one embodiment, the molded mixture is removed by pulling the transportation sheet 402 off the mold plate 40c and onto a transportation belt for transfer into a vacuum press machine. After the slab 400 of FIG. 7, is pressed, it is moved into a curing machine. After curing, the surfaces of the cured slab are ground down to desired thickness then polished to reveal the finished, patterned slab. The mold cover including 40a, 40b, and 40d, mold gate 50 and plate 40c are returned for use in producing another mixture formation.

The computer processor 602 is also connected by communications links to valves 4, 14, and 24 as shown in FIG. 8. The computer processor 602 can control the amount of a particular mixture of quartz and resin that is applied to the inner chamber 40g of the mold 40 by controlling the amount of opening and closing of the valves 4, 14, and 24, and speed of belt 6,16 and 26, and the position and the movement of the mold 40. Alternatively or additionally these valves may also be controlled manually.

Figure 3:
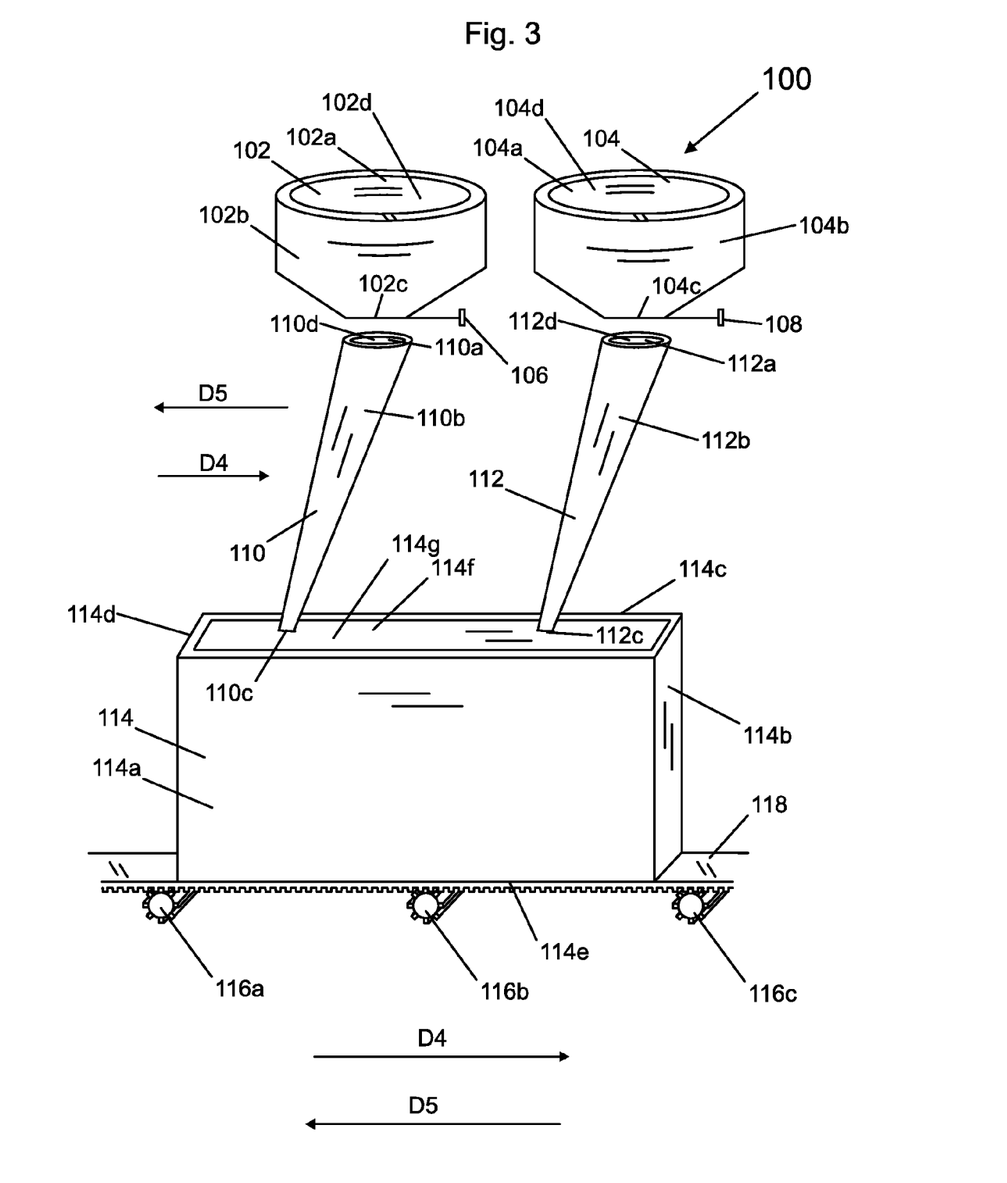
FIG. 3 shows a front, top, and right perspective view a first further apparatus in accordance with first further embodiment of the present invention.

FIG. 3 shows a front, top, and right perspective view a first further apparatus 100 in accordance with first further embodiment of the present invention. The first further apparatus 100 includes hoppers 102 and 104, funnels 110 and 112, mold 114, rack 118, and gears 116a, 116b, and 116c.

The hopper 102 includes top opening 102a, peripheral wall 102b, bottom opening 102c, and inner chamber 102d. The hopper 104 includes top opening 104a, peripheral wall 104b, bottom opening 104c, and inner chamber 104d. The bottom opening 102c is configured to be opened or closed by a valve 106 and the bottom opening 104c is configured to be opened or closed by a valve 108.

The funnel 110 includes a top opening 110a, a peripheral wall 110b, a bottom opening 110c, and an inner chamber 110d. The funnel 112 includes a top opening 112a, a peripheral wall 112b, a bottom opening 112c, and an inner chamber 112d.

The mold 114 includes a top opening 114f, an inner chamber 114g, walls 114a, 114b, 114c, 114d, and a bottom 114e. The mold 114 sits on a belt (or a rack gear structure) 118 or conveyor belt which rides on rollers 116a, 116b, and 116c. Each of the rollers 116a-c may have a motor which is controlled by computer processor 702 in FIG. 9.

Figure 9:
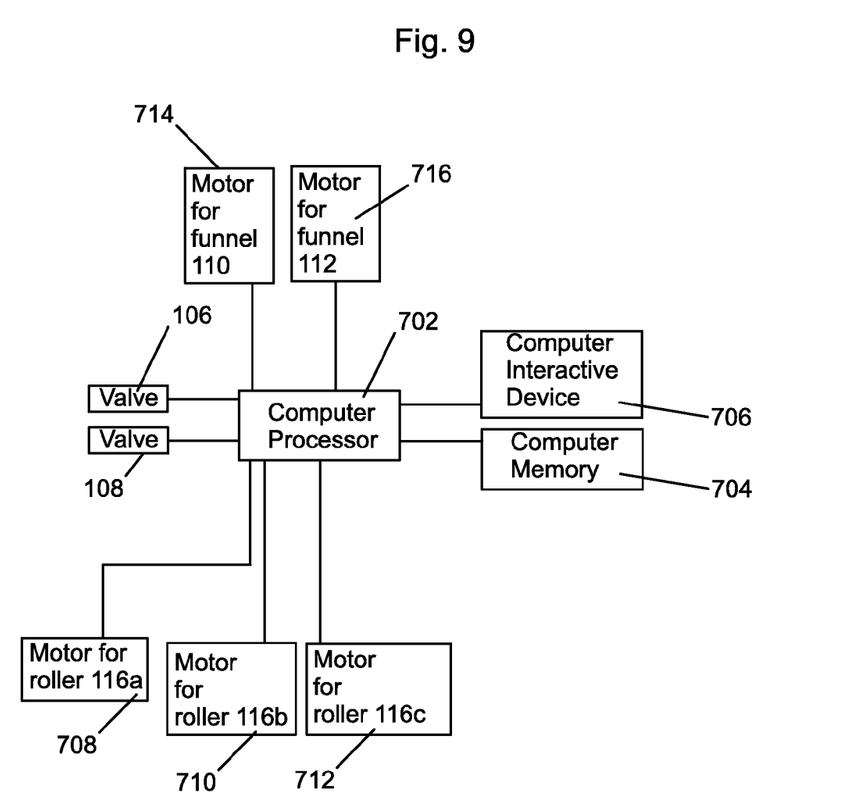
FIG. 9 shows a block diagram of a computer processor and other components for controlling one or more aspects of the apparatus of FIG. 3.

FIG. 9 shows a block diagram of a computer processor 702, a computer interactive device 706, a computer memory 704, an motors 708, 710, and 712, for rollers 116a-c, respectively. In operation the computer processor 702 may control the rotational speed and rotational direction of the gears 116a-116c, in order to control the back and forth movement, in the directions D4 and D5, of the mold 114 shown in FIG. 3 or may control the position of the mold 114 by controlling the gear 116a-c to control the rack 118 movement. In FIG. 3, the mold 114 has been put on a rack or belt structure including 118, 116a, 116b, 116c, moved by a motor which is controlled by computer processor 602. In one or more embodiments of the present invention, the mold 114 could also be pulled or pushed back and forth in the direction D4 and D5 by other means, such as for example, a cable structure, by a hydraulic mechanism structure, by a pneumatic structure, or other method or combined method of driving mechanism, which could be controlled by a computer or computer processor. The inner chamber 102d of the hopper 102 may contain one mixture of quartz and resin of a particular color or color mixture, and the inner chamber 104d of the hopper 104 may contain a different mixture of quartz and resin of a different color or color mixture. The computer processor 702 may control the valves 106 and 108 to control the amount of a particular mixture of quartz and resin to be supplied to the inner chamber 114g of the mold 114. The computer processor 702 may be connected by communications links to motors for funnels 110 and 112. The computer processor 702 may control motors 714 and 716 to move the funnels 110 and 112 back and forth in the directions D5 and D4 at a speed or variable speed which can also be controlled by the computer processor 702. When the inner chamber 114g of the mold 114 is filled with quartz and resin, the mold 114 can be placed in a horizontal or flat position with the opening 114f covered to prevent quartz and resin from spilling out of the inner chamber 114g.

Figure 4:
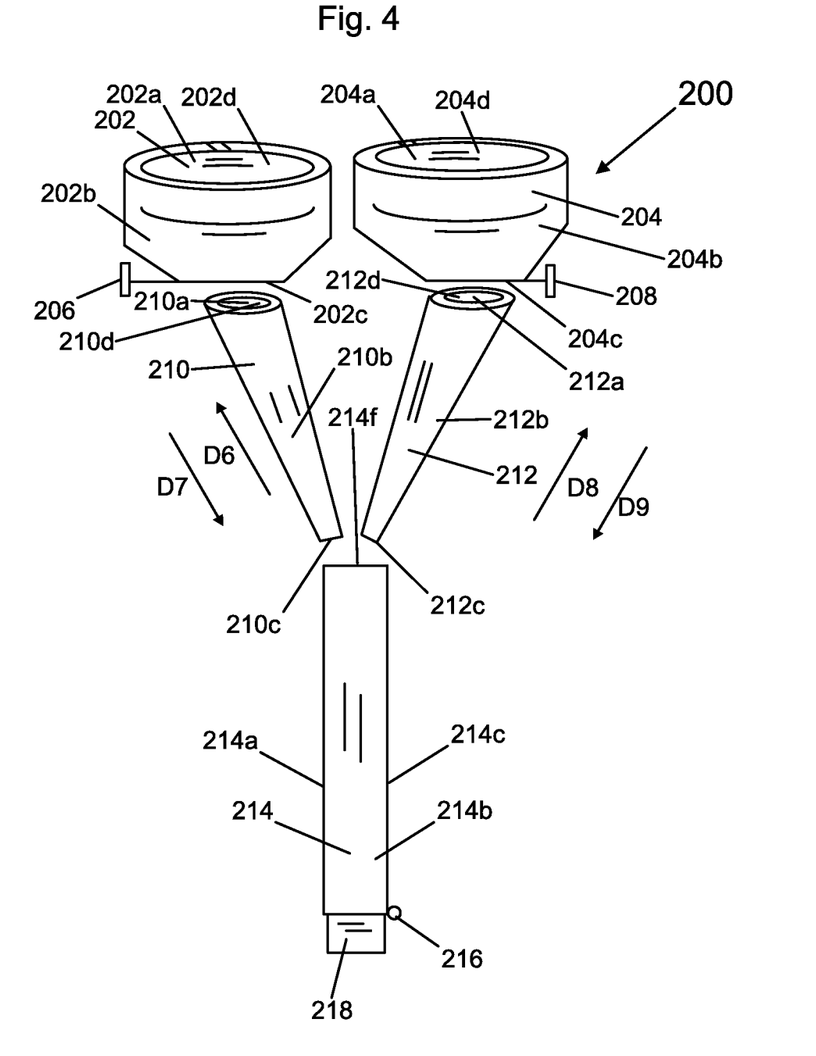
FIG. 4 shows a front and top perspective view of second further apparatus in accordance with a second further embodiment of the present invention.

FIG. 4 shows a front and top perspective view of second further apparatus 200 in accordance with a second further embodiment of the present invention. The second further apparatus 200 may include hoppers 202, 204, funnels 210 and 212, and mold 214.

The hopper 202 includes top opening 202a, peripheral wall 202b, bottom opening 202c, and inner chamber 202d. The hopper 204 includes top opening 204a, peripheral wall 204b, bottom opening 204c, and inner chamber 204d. The bottom opening 202c is configured to be opened or closed by a valve 206 and the bottom opening 204c is configured to be opened or closed by a valve 208.

The funnel 210 includes a top opening 210a, a peripheral wall 210b, a bottom opening 210c, and an inner chamber 210d. The funnel 212 includes a top opening 212a, a peripheral wall 212b, a bottom opening 212c, and an inner chamber 212d.

The mold 214 may be identical to the mold 114 of FIG. 3. The mold 214 includes a top opening 214f, an inner chamber not shown, analogous to inner chamber 114g of FIG. 3., walls 214a, 214b, 214c, and a wall analogous to wall 114d, and a bottom 214e. The mold 214 sits on a rack 218.

Figure 10:
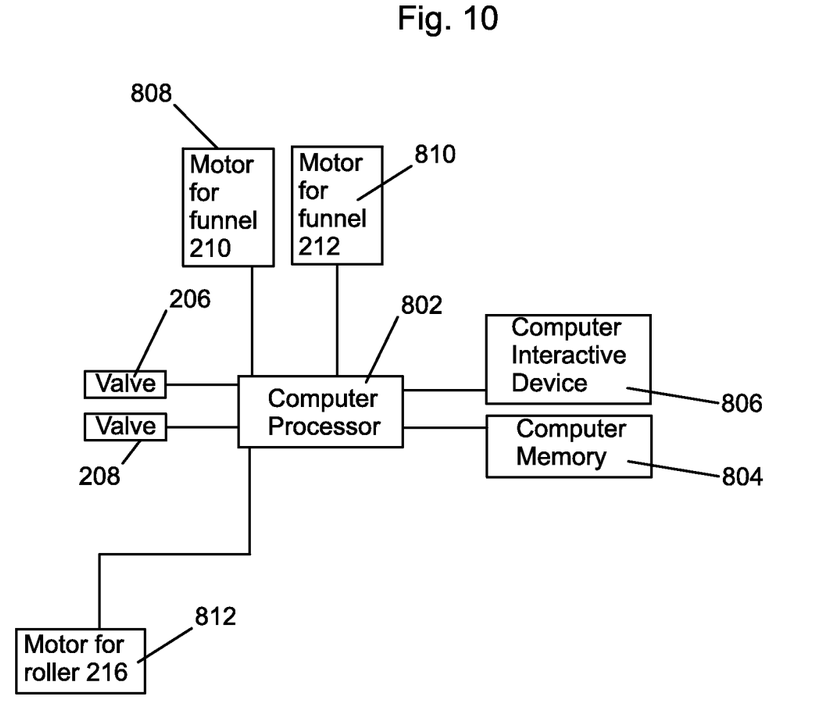
FIG. 10 shows a block diagram of a computer processor and other components for controlling one or more aspects of the apparatus of FIG. 4.

A computer processor 802 shown in FIG. 10, may control motors 808 and 810 for funnels 210 and 212 to move them in the directions D7 and D6 for funnel 210 and D8 and D9 for funnel 212, as shown in FIG. 4. The computer processor 802 of FIG. 10 may also control valves 206 and 208 similar to the control of valves 106 and 108. First and second mixtures of quartz and resin may be placed in hoppers 202 and 204. A motor 812 may also be controlled for the roller 216 to turn the mold 214 ninety degrees from the vertical shown in FIG. 4, to a horizontal position perpendicular to the position of FIG. 4, after the mold 214 is filled with a mixture from hoppers 202 and 204 and after a mold gate similar or identical to mold gate 50 of FIG. 6 has been placed so that it completely covers the opening 214f.

Figure 5:
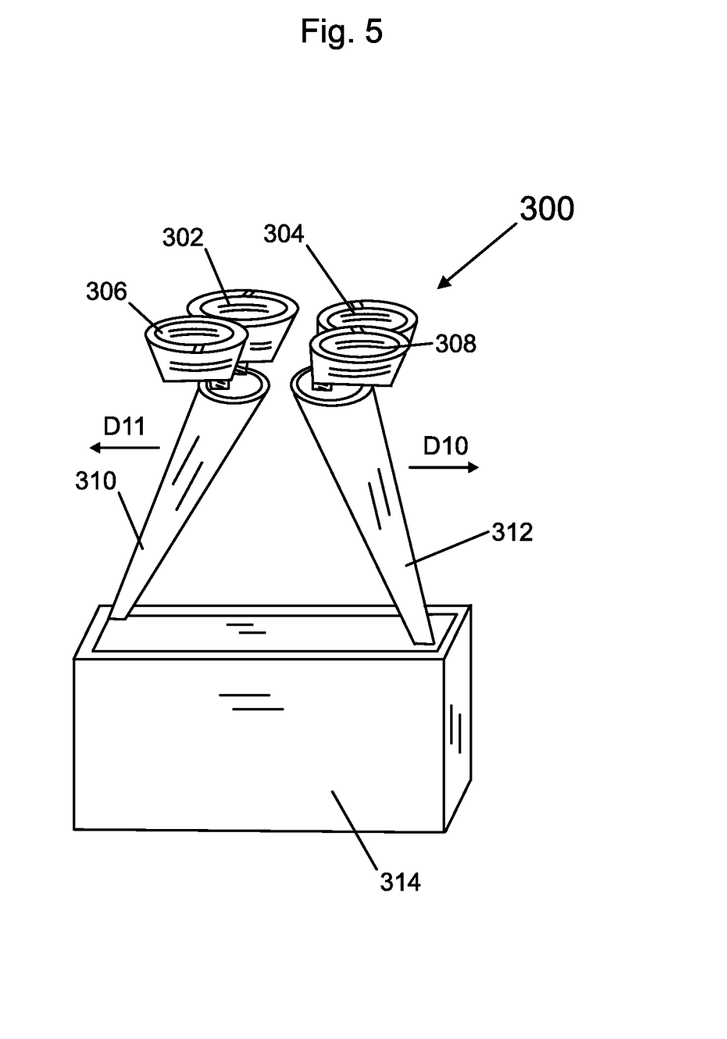
FIG. 5 shows a front, top and right perspective view of a third further apparatus in accordance with a third further embodiment of the present invention.

FIG. 5 shows a front, top and right perspective view of a third further apparatus 300 in accordance with a third further embodiment of the present invention. The third further apparatus 300 includes hoppers 302, 304, 306, and 308, funnels 310 and 312 and mold 314. Each of the hoppers 302, 304, 306, and 308 may be identical or substantially similar to the hopper 202 of FIG. 4, and may include a valve, similar to identical to valve 4, not shown. Each of the funnels 310 and 312 may be identical to funnel 110 of FIG. 1. The mold 314 may be identical to the mold 40 shown in FIG. 1. In FIG. 5, the hoppers 302 and 306 drop material into the same funnel 310 to form a new mixture. In FIG. 5, the hoppers 304 and 308 drop material into the same funnel 312 to form a new mixture. The valves of hoppers 302, 304, 306, and 308, not shown, may be computer processor controlled. The funnels 310 and 312 may have their movement controlled through motors, not shown, which move the funnels 310 and 312 in the directions D10 and D11.

FIG. 6 shows a front view of the mold 40 of FIG. 1 in accordance with an embodiment of the present invention. The mold 40 includes a mold plate or side 40c, the transporting sheet 402, a mold cover or plate 40a which may be transparent tempered glass. A mold gate 50 may be provided to cover the opening 40f of FIG. 1, so that quartz and resin does not spill out from the inner chamber 40g of the mold 40.

FIG. 7 shows a front, top, and right perspective view of the mold 40, with the gate 50 attached, together with the side or top 40a and sides 40b and 40d and a formed piece of quartz and resin mixture 400 on a transporting sheet 402, on a mold plate 40c. The mold cover gate 50 is removed to accept quartz and resin mixture when the mold 40 is in the vertical position of FIG. 1. In operation, the formed, but not pressed and not cured mixture 400, which was drop formed in the inner chamber 40g of the mold 40, is thereafter pulled by grabbing the transporting sheet 402, moved to a press machine, and then moved into a curing machine. To make another slab, such as for example, a slab with the same or similar overall mixture and/or pattern of quartz and resin, or another slab with a different mixture and/or pattern of quartz and resin, but similar or identical in dimensions to the formed slab 400, a new transporting sheet, analogous or identical to sheet 402 is placed on the mold plate 40c. Then the mold cover, including 40a, 40d, and 40b is lowered onto the mold plate 40c, then the complete mold 40 is rotated ninety degrees to a vertical position, the cover gate 50 is moved away, and the mold 40 is ready to accept the next batch of quartz and resin mixture in the manner and/or configurations of FIG. 1, FIG. 3, FIG. 4, or FIG. 5. The side or top 40a of the mold may be made of clear tempered glass to allow the pattern of quartz and resin which is being formed in the inner chamber 40g of the mold 40 to be seen. The rest of the mold 40 such as the mold plate 40c, bottom 40e, and sides 40b and 40d may be made of steel or other metal.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a mold having a top opening which leads to an inner chamber, and the mold including a first wall, a second wall, a third wall, and a fourth wall, and a bottom which enclose the inner chamber;
a first device which is configured with respect to the mold to supply a first mixture of quartz and resin to the inner chamber of the mold; and
a computer processor which is configured to control the first device to supply the first mixture to the inner chamber of the mold through a first region of the top opening but not through a second region of the top opening during a first state, and to supply the first mixture to the inner chamber of the mold through the second region of the top opening, but not through the first region of the top opening during a second state.

2. The apparatus of claim 1 wherein
the top opening has a length and a width, wherein the length is substantially greater than the width;
wherein the computer processor is configured to cause the first device to move along the length of the top opening to thereby change the first device from the first state to the second state.

3. The apparatus of claim 1 wherein
the first device includes a first hopper, a first belt, and a first set of one or more rollers;
wherein the top opening has a length and a width, wherein the length is substantially greater than the width;
wherein the computer processor is configured to cause the first hopper, the first belt, and the first set of one or more rollers of the first device to move along the length of the top opening to thereby change the first device from the first state to the second state.

4. The apparatus of claim 3 wherein
the first device includes a first valve; and
wherein the first valve controls a size of a bottom opening of the first hopper through which the first mixture of quartz and resin is supplied to the first belt;
and wherein the first belt moves to supply the first mixture of quartz and resin to the inner chamber of the mold.

5. The apparatus of claim 3 wherein
the computer processor communicates with the first device to control a rotational speed of at least one roller of the first set of one or more rollers to thereby control the amount of the first mixture supplied to the inner chamber of the mold.

6. The apparatus of claim 1 further comprising
a second device which is configured with respect to the mold to supply a second mixture of quartz and resin to the inner chamber of the mold, while at the same time the first device is supplying the first mixture of quartz and resin to the inner chamber of the mold; and
wherein the computer processor which is configured to control the second device to supply the second mixture to the inner chamber of the mold through a third region of the top opening but not through a fourth region of the top opening during a third state, and to supply the second mixture to the inner chamber of the mold through the fourth region of the top opening, but not through the third region of the top opening during a fourth state.

7. The apparatus of claim 6 wherein
the first device includes a first hopper, a first belt, and a first set of one or more rollers;
the second device includes a second hopper, a second belt, and a second set of one or more rollers; and
wherein the top opening has a length and a width, wherein the length is substantially greater than the width;
wherein the computer processor is configured to cause the first hopper, the first belt, and the first set of one or more rollers of the first device to move along the length of the top opening to thereby change the first device from the first state to the second state; and wherein the computer processor is configured to cause the second hopper, the second belt, and the second set of one or more rollers of the second device to move along the length of the top opening to thereby change the second device from the third state to the fourth state.

8. The apparatus of claim 7 wherein
the first device includes a first valve; and
wherein the first valve controls a size of a bottom opening of the first hopper through which the first mixture of quartz and resin is supplied to the first belt;
wherein the first belt moves to supply the first mixture of quartz and resin to the inner chamber of the mold;
wherein the second device includes a second valve; and
wherein the second valve controls a size of a bottom opening of the second hopper through which the second mixture of quartz and resin is supplied to the second belt;
wherein the second belt moves to supply the second mixture of quartz and resin to the inner chamber of the mold.

9. The apparatus of claim 7 wherein
the computer processor communicates with the first device to control a rotational speed of at least one roller of the first set of one or more rollers to thereby control the amount of the first mixture supplied to the inner chamber of the mold;
and wherein the computer processor communicates with the second device to control a rotational speed of at least one roller of the second set of one or more rollers to thereby control the amount of the second mixture supplied to the inner chamber of the mold.

10. The apparatus of claim 1 wherein
the computer processor communicates with the first device to control how much of the first mixture of quartz and resin is supplied to the inner chamber of the mold by the first device.

11. An apparatus comprising:
a mold having a top opening which leads to an inner chamber, and the mold including a first wall, a second wall, a third wall, and a fourth wall, and a bottom which enclose the inner chamber; and
a first device which is configured with respect to the mold to supply a first mixture of quartz and resin to the inner chamber of the mold;
further comprising
a mold belt having grooves;
one or more gears with protrusions which mesh with the grooves of the mold belt;
and wherein the mold is configured to be supported on the mold belt having grooves.

12. An apparatus comprising:
a mold having a top opening which leads to an inner chamber, and the mold including a first wall, a second wall, a third wall, and a fourth wall, and a bottom which enclose the inner chamber; and
a first device which is configured with respect to the mold to supply a first mixture of quartz and resin to the inner chamber of the mold; and
wherein
the first device includes a first hopper having a bottom opening, and first funnel having a top opening and a bottom opening;
wherein the first funnel is fixed with respect to the first hopper so that the top opening of the first funnel receives the first mixture of quartz and resin which falls through the bottom opening of the first hopper;
and further comprising a first motor for controlling an orientation of the first funnel so that the bottom opening of the first funnel can be placed at different locations with respect to the top opening of the mold.

13. An apparatus comprising:
a mold having a top opening which leads to an inner chamber, and the mold including a first wall, a second wall, a third wall, and a fourth wall, and a bottom which enclose the inner chamber; and
a first device which is configured with respect to the mold to supply a first mixture of quartz and resin to the inner chamber of the mold; and
a second device which is configured with respect to the mold to supply a second mixture of quartz and resin to the inner chamber of the mold, while at the same time the first device is supplying the first mixture of quartz and resin to the inner chamber of the mold; and
wherein
the first device includes a first hopper having a bottom opening, and first funnel having a top opening and a bottom opening;
wherein the first funnel is fixed with respect to the first hopper so that the top opening of the first funnel receives the first mixture of quartz and resin which falls through the bottom opening of the first hopper;
and further comprising a motor for controlling an orientation of the first funnel so that the bottom opening of the first funnel can be placed at different locations with respect to the top opening of the mold;
wherein the second device includes a second hopper having a bottom opening, and a second funnel having a top opening and a bottom opening;
wherein the second funnel is fixed with respect to the second hopper so that the top opening of the second funnel receives the second mixture of quartz and resin which falls through the bottom opening of the second hopper;
and further comprising a second motor for controlling an orientation of the second funnel so that the bottom opening of the second funnel can be placed at different locations with respect to the top opening of the mold.

14. A method comprising
supplying a first mixture of quartz and resin to an inner chamber of a mold;
wherein the mold has a top opening which leads to the inner chamber, and the mold includes a first wall, a second wall, a third wall, and a fourth wall, and a bottom which enclose the inner chamber; and further comprising
using a computer processor to controllably supply the first mixture to the inner chamber of the mold through a first region of the top opening but not through a second region of the top opening during a first state, and
using the computer processor to controllably supply the first mixture to the inner chamber of the mold through the second region of the top opening, but not through the first region of the top opening during a second state.

15. The method of claim 14 further comprising
closing the top opening of the mold with a mold gate after the first mixture of quartz and resin has been supplied to the inner chamber; and
turning the mold about ninety degrees;
lifting a mold cover, including the first wall, the second wall, the fourth wall, the bottom, and the mold gate off of the third wall;

moving a slab formed at least in part from the first mixture of quartz and resin on a transportation sheet sandwiched between the slab and the third wall; and wherein the transportation sheet has an area, and the third wall has an area; and wherein the area of the transportation sheet is greater than the area of the third wall.

16. The method of claim 14 wherein the first mixture is supplied by a first device including a first hopper, a first belt, and a first set of one or more rollers.

17. The method of claim 16 wherein the first device includes a first valve; and wherein the first valve controls a size of a bottom opening of the first hopper through which the first mixture of quartz and resin is supplied to the first belt;

and wherein the first belt moves to supply the first mixture of quartz and resin to the inner chamber of the mold.

18. The method of claim 16 further comprising controlling a rotational speed of at least one roller of the first set of one or more rollers to thereby control the amount of the first mixture supplied to the inner chamber of the mold.

19. The method of claim 14 further comprising using a computer processor to control how much of the first mixture of quartz and resin is supplied to the inner chamber of the mold by the first device.

20. A method comprising supplying a first mixture of quartz and resin to an inner chamber of a mold;

wherein the mold has a top opening which leads to an inner chamber, and the mold includes a first wall, a second wall, a third wall, and a fourth wall, and a bottom which enclose the inner chamber; and wherein the first mixture is supplied by a first device including a first hopper, a first belt, and a first set of one or more rollers; and further comprising moving the mold on a mold belt, which is moved by one or more gears; and wherein each of the one or more gears has protrusions which mesh with grooves of the mold belt.

21. The method of claim 20 further comprising supplying a second mixture of quartz and resin to an inner chamber of a mold, wherein the second mixture is different from the first mixture.

22. The method of claim 21 wherein the first mixture is supplied by a first device including a first hopper, a first belt, and a first set of one or more rollers;

and the second mixture is supplied by a second device including a second hopper, a second belt, and a second set of one or more rollers.

23. The method of claim 22 wherein the first device includes a first valve; and wherein the first valve controls a size of a bottom opening of the first hopper through which the first mixture of quartz and resin is supplied to the first belt;

wherein the first belt moves to supply the first mixture of quartz and resin to the inner chamber of the mold;

wherein the second device includes a second valve; and wherein the second valve controls a size of a bottom opening of the second hopper through which the second mixture of quartz and resin is supplied to the second belt;

wherein the second belt moves to supply the second mixture of quartz and resin to the inner chamber of the mold.

24. The method of claim 22 further comprising controlling a rotational speed of at least one roller of the first set of one or more rollers to thereby control the amount of the first mixture supplied to the inner chamber of the mold; and controlling a rotational speed of at least one roller of the second set of one or more rollers to thereby control the amount of the second mixture supplied to the inner chamber of the mold.

25. A method comprising supplying a first mixture of quartz and resin to an inner chamber of a mold;

wherein the mold has a top opening which leads to an inner chamber, and the mold includes a first wall, a second wall, a third wall, and a fourth wall, and a bottom which enclose the inner chamber;

wherein the first mixture is supplied by a first device;

wherein the first device includes a first hopper having a bottom opening, and a first funnel having a top opening and a bottom opening;

wherein the first funnel is fixed with respect to the first hopper so that the top opening of the first funnel receives the first mixture of quartz and resin which falls through the bottom opening of the first hopper;

and further comprising controlling an orientation of the first funnel so that the bottom opening of the first funnel can be placed at different locations with respect to the top opening of the mold.

26. The method of claim 25 supplying a second mixture of quartz and resin to the inner chamber of the mold;

wherein the second mixture is supplied by a second device;

wherein the second device includes a second hopper having a bottom opening, and a second funnel having a top opening and a bottom opening;

wherein the second funnel is fixed with respect to the second hopper so that the top opening of the second funnel receives the second mixture of quartz and resin which falls through the bottom opening of the second hopper;

and further comprising controlling an orientation of the second funnel so that the bottom opening of the second funnel can be placed at different locations with respect to the top opening of the mold.

* * * * *